(12) United States Patent
Kim et al.

(10) Patent No.: US 12,241,549 B2
(45) Date of Patent: Mar. 4, 2025

(54) PISTON PIN AND MANUFACTURING METHOD THEREOF

(71) Applicants: HYUNDAI MOTOR COMPANY, Seoul (KR); KIA CORPORATION, Seoul (KR); SINTERON, Hwaseong-si (KR)

(72) Inventors: Haksoo Kim, Seoul (KR); Byung Chan Kang, Suwon-si (KR); Dong Wook Park, Hwaseong-si (KR); Myeong Inn Na, Osan-si (KR)

(73) Assignees: HYUNDAI MOTOR COMPANY, Seoul (KR); KIA CORPORATION, Seoul (KR); SINTERON, Hwaseong-si (KR)

( * ) Notice: Subject to any disclaimer, the term of this patent is extended or adjusted under 35 U.S.C. 154(b) by 778 days.

(21) Appl. No.: 17/244,646

(22) Filed: Apr. 29, 2021

(65) Prior Publication Data
US 2022/0252157 A1 Aug. 11, 2022

(30) Foreign Application Priority Data
Feb. 8, 2021 (KR) ........................ 10-2021-0017542

(51) Int. Cl.
*F16J 1/16* (2006.01)
*B22F 3/16* (2006.01)
*B22F 5/00* (2006.01)
*F16J 1/01* (2006.01)

(52) U.S. Cl.
CPC ..................... *F16J 1/16* (2013.01); *B22F 3/16* (2013.01); *B22F 5/008* (2013.01); *F16J 1/01* (2013.01); *B22F 2301/10* (2013.01); *B22F 2301/15* (2013.01); *B22F 2301/35* (2013.01); *B22F 2302/40* (2013.01)

(58) Field of Classification Search
CPC ...... F16J 1/16; F16J 1/01; B22F 5/008; B22F 2301/10; B22F 2301/15; B22F 2301/35; B22F 2302/40
See application file for complete search history.

(56) References Cited

U.S. PATENT DOCUMENTS

| | | | |
|---|---|---|---|
| 9,404,577 B2 | 8/2016 | Hein | |
| 10,295,057 B2 | 5/2019 | Kim | |
| 2015/0136063 A1* | 5/2015 | Hein | F16J 1/16 123/193.6 |
| 2016/0369881 A1* | 12/2016 | Okuno | C22C 38/08 |
| 2017/0074399 A1* | 3/2017 | Kim | B22F 3/24 |
| 2017/0167607 A1 | 6/2017 | Kim | |

FOREIGN PATENT DOCUMENTS

| | | |
|---|---|---|
| KR | 101724968 B1 | 4/2017 |
| KR | 20200070692 A | 6/2020 |

* cited by examiner

*Primary Examiner* — Daniel J Wiley
(74) *Attorney, Agent, or Firm* — Lempia Summerfield Katz LLC

(57) ABSTRACT

A piston pin includes a pipe-shaped main body made of an iron-based sintered alloy. The piston pin is installed to penetrate an upper end of the connecting rod and the piston and the piston pin has an eccentric mass center in a circumferential direction.

16 Claims, 10 Drawing Sheets

PISTON PIN AND MANUFACTURING METHOD THEREOF

CROSS-REFERENCE TO RELATED APPLICATION

This application claims priority to and the benefit of Korean Patent Application No. 10-2021-0017542 filed in the Korean Intellectual Property Office on Feb. 8, 2021, the entire contents of which are incorporated herein by reference.

BACKGROUND

(a) Field of the Disclosure

The present disclosure relates to a piston pin that may be rotated when the piston is elevated by an operation of an engine to provide improved lubrication, and to a manufacturing method thereof.

(b) Description of the Related Art

A piston pin is a part that connects a piston and a connecting rod in an engine. The piston pin slightly irregularly rotates within a bush of a small end portion of the connecting rod due to acceleration force and friction force applied during up and down movement of the connecting rod. The rotation at this time is close to conical motion due to small unequal force and weak friction of the piston pin.

Oil injected from a block oil jet to a lower portion of the piston hits a lower surface of the piston and is indirectly supplied to the small end portion of the connecting rod. When the piston pin does not rotate smoothly, the piston pin may not be properly lubricated.

In addition, recently, engines use low-viscosity oil for a purpose of improving fuel economy. Also, combustion pressure is increasing. Thus, a lubrication environment of the piston pin may be degraded.

The above information disclosed in this Background section is only to enhance understanding of the background of the disclosure. Therefore, the Background section may contain information that does not form the prior art that is already known in this country to a person of ordinary skill in the art.

SUMMARY

An embodiment provides a piston pin with improved lubrication by being rotated when a piston is elevated by an engine operation.

Another embodiment provides a manufacturing method of a piston pin in which a weight increase of the piston pin is minimized when imbalance is artificially applied by an additional method. The manufacturing method is also advantageous in terms of process and cost, while minimizing the imbalance in which a center of rotation and a center of gravity of the pin do not coincide due to dimensional deviation due to machining errors.

According to an embodiment, a piston pin includes a pipe-shaped main body made of an iron-based sintered alloy. The piston pin is installed to penetrate an upper end of the connecting rod and the piston and the piston pin has an eccentric mass center in a circumferential direction.

The iron-based sintered alloy may include, based on an entire weight of the iron-based sintered alloy, carbon (C) at 0.4 wt % to 0.8 wt %; chromium (Cr) at 0.2 wt % to 3.5 wt %; molybdenum (Mo) at 0.1 wt % to 0.3 wt %; nickel (Ni), manganese (Mn), copper (Cu), or a mixture thereof at 0.2 wt % to 2.0 wt %; and iron (Fe) as a balance.

The piston pin may include a first area and a second area divided in the circumferential direction. The first area and the second area may have different densities.

A density difference between the first area and the second area may be 0.05 g/cm$^3$ or more.

The first area may occupy an area of 30 degrees to 330 degrees in the circumferential direction.

An area dividing line separating the first area from the second area may form an angle of 90 degrees with a tangent of an outer diameter of the pipe or a tangent of an inner diameter of the pipe.

A center of the outer diameter of the pipe and a center of the inner diameter of the pipe may be eccentric by 0.1 mm or more.

The piston pin may include a first area and a second area divided in the circumferential direction. The first area may include a metal infiltrating material.

The piston pin may include a first area and a second area divided in the circumferential direction. A metal paste may be applied to an inner diameter surface of the first area.

The metal may contain copper (Cu).

A density difference between the first area and the second area may be 0.05 g/cm$^3$ or more.

The piston pin may include a first area and a second area divided in the circumferential direction. The first area and the second area may have different densities. A center of the outer diameter of the pipe and a center of the inner diameter of the pipe may be eccentric by 0.1 mm or more. The first area may include a metal infiltrating material or a metal paste applied to an inner diameter surface of the first area.

According to another embodiment, a manufacturing method of a piston pin includes filling an iron-based alloy powder into a mold and then pressurizing it to form a pipe shape and sintering a molded body molded into the pipe shape. An operation of operating a mass center in a circumferential direction of the molded body to be eccentric is included.

The operation of operating the mass center in the circumferential direction of the molded body to be eccentric may be performed by filling the iron-based alloy powder so that powder filling heights are different in the circumferential direction when filling the iron-based alloy powder into the mold, and then by pressing the iron-based alloy powder so that the powder filling heights are the same in the circumferential direction when pressing the iron-based alloy powder.

The mold may include: a die including a cylinder-shaped powder filling space; a core positioned to be spaced apart from the die at a central portion of the powder filling space; and an upper punch and a lower punch that pressurize the powder filled between the die and the core. The lower punch may include a first lower punch and a second lower punch divided in the circumferential direction.

The operation of operating the mass center in the circumferential direction of the molded body to be eccentric may be performed by differently setting heights of the first lower punch and the second lower punch, filling the iron-based alloy powder into the mold, and then pressing the iron-based alloy powder to be the same height in the circumferential direction.

The operation of operating the mass center in the circumferential direction of the molded body to be eccentric may be performed by forming a center of the core and a center of the powder filling space of the die to be eccentric.

The operation of operating the mass center in the circumferential direction of the molded body to be eccentric may be performed by applying a metal infiltrating material to a first area among the first and second areas divided in the circumferential direction of the molded body before the sintering and then sintering it.

The operation of operating the mass center in the circumferential direction of the molded body to be eccentric may be performed by applying a metal paste to an inner diameter surface of a first area among the first and second areas divided in the circumferential direction of the molded body before the sintering and then sintering it.

According to the manufacturing method of the piston pin of the disclosure, while minimizing imbalance in which a center of rotation and a center of gravity of the pin do not coincide due to dimensional deviation due to machining errors, when the imbalance is artificially applied by an additional method, weight increase of the piston pin may be minimized. Also, the manufacturing method is advantageous in terms of process and cost.

DETAILED DESCRIPTION OF THE EMBODIMENTS

Advantages and features of the present disclosure and methods of accomplishing the same may be understood more readily by reference to the following detailed description of embodiments and the accompanying drawings. However, this disclosure may be embodied in many different forms and is not to be construed as limited to the embodiments set forth herein. Unless otherwise defined, all terms (including technical and scientific terms) used herein have the same meaning as commonly understood by one of ordinary skill in the art. Further, it should be further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein. Throughout the specification, unless explicitly described to the contrary, the word "comprise" and variations such as "comprises" or "comprising" should be understood to imply the inclusion of stated elements but not the exclusion of any other elements.

Further, as used herein, the singular forms "a", "an", and "the" are intended to include the plural forms as well, unless the context clearly indicates otherwise.

Figure 1:
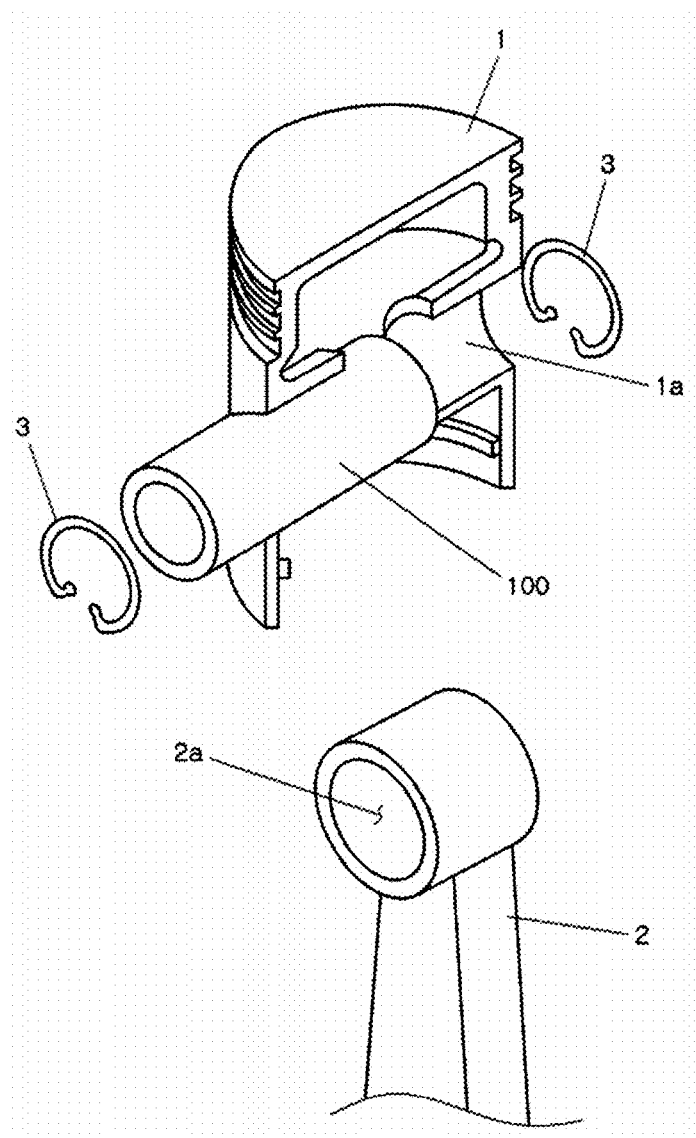
FIG. 1 illustrates an exploded perspective view of a state in which a piston and a connecting rod are connected by using a piston pin.

FIG. 1 illustrates an exploded perspective view of a state in which a piston 1 and a connecting rod are connected by using a piston pin 100.

Referring to FIG. 1, the piston pin 100 connecting the piston 1 and a connecting rod 2 in an engine may have a pipe shape (i.e., a cylindrical shape).

The piston pin 100 passes through a small end portion 2a of the connecting rod 2 and is fixed to the piston 1 by using a snap ring 3 in a state that passes through the piston 1, thereby connecting the piston 1 and the connecting rod 2.

Meanwhile, the piston pin 100 made of a conventional steel material has a relatively high elastic coefficient (210 GPa), so the piston pin 100 may be designed thinner than that made of other materials. However, in a case of cold-forming the steel material, since a molding tolerance is a ±0.2 level, a thickness thereof should be selected in consideration of a safety factor according to the molding tolerance. When roughing/finishing are performed during inner diameter machining, a dimensional tolerance is within ±0.05, so a cost may increase. In addition, compared with materials such as aluminum, cast iron, and sinter, which must have a small inner diameter due to a low modulus of elasticity, a steel material has greater sensitivity to an oval safety factor for additional eccentricity in addition to a processing error. In addition, even when the inner diameter is eccentrically processed after cold-forming, there is a problem in that a weight increase occurs as width increases because the inner diameter dimension must be reduced in consideration of a safety factor according to the eccentricity. Meanwhile, in a case of using a casting method, a density may be non-uniform due to a large shrinkage hole. In a case of using a forging method, a dimensional tolerance of a material is large, which may be inappropriate in terms of reproducibility.

Accordingly, the piston pin 100 according to the embodiment includes an iron-based sintered alloy.

In other words, the piston pin 100 is a sintered piston pin 100 manufactured by sintering an iron-based sintered powder by applying a sintering method, so that it may have a precise dimensional accuracy of ±0.05 compared with an existing steel material with a molding tolerance of ±0.2. Accordingly, it is possible to minimize an imbalance in which the rotation center and mass center of the pin do not coincide due to the dimensional deviation due to the molding tolerance.

The iron-based sintered alloy may be manufactured by sintering, for example, a Cr—Mo Pre alloy powder containing chromium (Cr) and molybdenum (Mo). The Cr—Mo Pre alloy has a high gas-nitrocarburized effect and may be used for all sintered materials, and a material thereof may be selected in consideration of price, dimensional stability, and surface pressure.

For example, the iron-based sintered alloy may include, based on an entire weight of the iron-based sintered alloy, carbon (C) at 0.4 wt % to 0.8 wt %; chromium (Cr) at 0.2 wt % to 3.5 wt %; molybdenum (Mo) at 0.1 wt % to 0.3 wt %; nickel (Ni), manganese (Mn), copper (Cu), or a mixture thereof at 0.2 wt % to 2.0 wt %; and iron (Fe) as a balance.

Carbon (C) contributes to formation of bainite and tempered martensitic structures as it is advantageous in strengthening a matrix before gas-nitrocarburizing. When a content of carbon is less than 0.4 wt %, strength thereof may be deteriorated due to ferrite formation, while when it exceeds 0.8 wt %, carbon segregation and material stability may be deteriorated.

Chromium (Cr) and molybdenum (Mo) contribute to improvement of wear and fatigue strength by forming a compound and a nitride in a surface and pores during gas-nitrocarburizing. When a content of chromium (Cr) is less than 0.2 wt %, fatigue strength may be deteriorated, and a gas-nitrocarburized effect may be insufficient, while when it exceeds 3.5 wt %, formability is deteriorated, and nitride formation may be difficult due to formation of a chromium oxide on a surface. When a content of molybdenum (Mo) is less than 0.1 wt %, fatigue strength may be deteriorated, and a gas-nitrocarburized effect may be insufficient. Whereas, when the Mo content exceeds 0.3 wt %, formability may be deteriorated, and a price may be increased.

A content of other impurities, such as nickel (Ni), manganese (Mn), copper (Cu), or a mixture thereof, is practically difficult to be manufactured at less than 0.2 wt %. When the content of other impurities exceeds 2.0 wt %, formability may be deteriorated.

Meanwhile, since the sintered piston pin 100 containing an iron-based sintered powder has a small dimensional tolerance and thus minimizes imbalance in which the rotation center and mass center of the piston pin 100 do not coincide, there is a need to artificially impart imbalance through an additional method. Accordingly, the piston pin 100 may have a structure in which a mass center thereof in a circumferential direction is eccentric.

Figure 2:
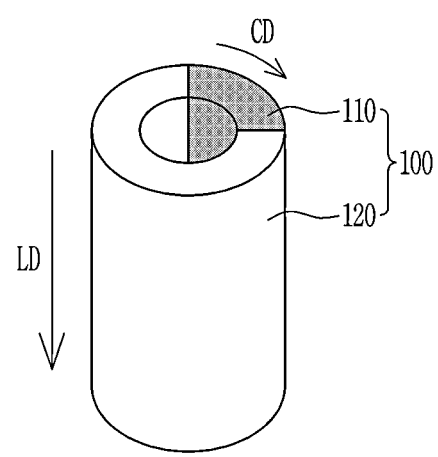
FIG. 2 illustrates a perspective view of a piston pin according to an embodiment.
Figure 3:
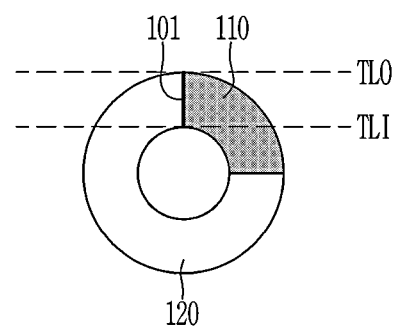
FIG. 3 illustrates a top plan view of an example of the piston pin of FIG. 2.
Figure 4:
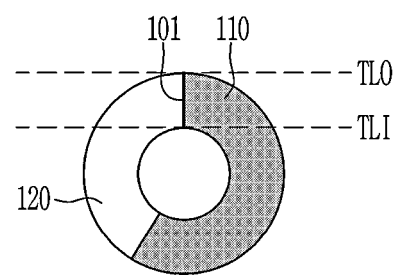
FIG. 4 illustrates a top plan view of another example of the piston pin of FIG. 2.

FIG. 2 illustrates a perspective view of the piston pin 100 according to the embodiment. FIG. 3 and FIG. 4, respectively, illustrate a top plan view of an example of the piston pin 100 of FIG. 2.

Referring to FIGS. 2-4, the piston pin 100 includes a first area 110 and a second area 120 divided in a circumferential direction CD. The first area 110 and the second area 120 have different densities. As shown in FIG. 2, the first area 110 and the second area 120 may extend in a length direction LD. Accordingly, the mass center of the piston pin 100 in the circumferential direction is eccentric.

A density difference between the first area 110 and the second area 120 may be 0.05 g/cm$^3$ or more. For example, the density difference between the first area 110 and the second area 120 may be 1 g/cm$^3$ to 3 g/cm$^3$. When the density difference between the first area 110 and the second area 120 is less than 0.05 g/cm$^3$, torque may be weak.

For example, the density of the piston pin 100 made of an iron-based sintered alloy may be about 6.4 g/cm$^3$ to 6.9 g/cm$^3$, the density of the first area 110 may be 6.4 g/cm$^3$ or more to less than 6.65 g/cm$^3$, and the density of the second area 120 may be 6.65 g/cm$^3$ or more to 6.9 g/cm$^3$.

The first area 110 may occupy an area of 30 degrees to 330 degrees in the circumferential direction. For example, as shown in FIG. 3, the first area 110 may occupy an area of 30 degrees to 90 degrees in the circumferential direction, and as shown in FIG. 4, the first area 110 may occupy an area of 90 degrees to 330 degrees in the circumferential direction. As described below, in order to secure rigidity of a lower punch of a mold for forming the first area 110 and the second area 120 that have different densities, the first area 110 and the second area 120 must be set at an interval of 30 degrees or more from a central axis of the piston pin 100.

In addition, an area dividing line 101 separating the first area 110 and the second area 120 may form 90 degrees with a tangent line TLO of an outer diameter of the pipe or a tangent line TLI of an inner diameter of the pipe. In other words, in order to minimize stress concentration of an edge of the lower punch of the mold, the angle formed by the dividing portion of the lower punch with the tangent line TLO of the outer diameter of the pipe or the tangent line TLI of the inner diameter of the pipe may be a perpendicular orientation (90 degrees).

Figure 5:
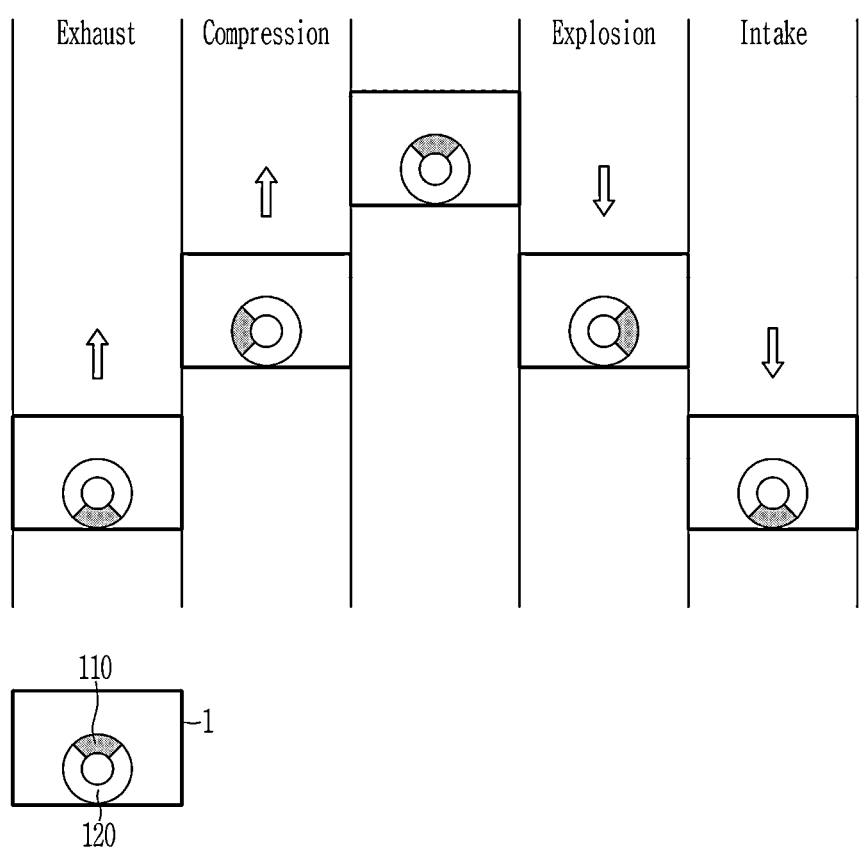
FIG. 5 illustrates a rotation operation of a piston pin for each piston driving step.

FIG. 5 illustrates a rotation operation of the piston pin 100 for each piston driving step. Referring to FIG. 5, when there is a difference in density (weight) in the circumferential direction CD of the piston pin 100, the mass center may be moved in an acceleration direction. In other words, centrifugal force acts in the acceleration direction by the stroke motion of the piston 1 and the connecting rod 2, so that the piston pin 100 rotates to the heavier side thereof.

Figure 6:
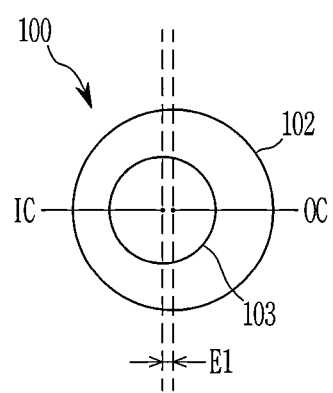
FIG. 6 illustrates a top plan view of a piston pin according to another embodiment.

FIG. 6 illustrates a top plan view of a piston pin 100 according to another embodiment.

Referring to FIG. 6, a center OC of an outer diameter 102 of the pipe and a center IC of an inner diameter 103 of the pipe may be eccentric. That is, a thickness of one side thereof in the circumferential direction of the pipe may be thicker than that of the other side.

Accordingly, since the mass center in the circumferential direction of the piston pin 100 is eccentric, when centrifugal force is applied in the acceleration direction by the stroke motion of the piston 1 and the connecting rod 2, the piston pin 100 may rotate to the heavy side thereof.

An eccentric distance E1 between the center OC of the outer diameter 102 of the pipe and the center IC of the inner diameter 103 of the pipe may be 0.1 mm or more, and for example, may be 0.1 mm to 0.5 mm. When the eccentric distance E1 between the center OC of the outer diameter 102 of the pipe and the center IC of the inner diameter 103 of the pipe is less than 0.1 mm, the torque thereof may be weak.

Figure 7:
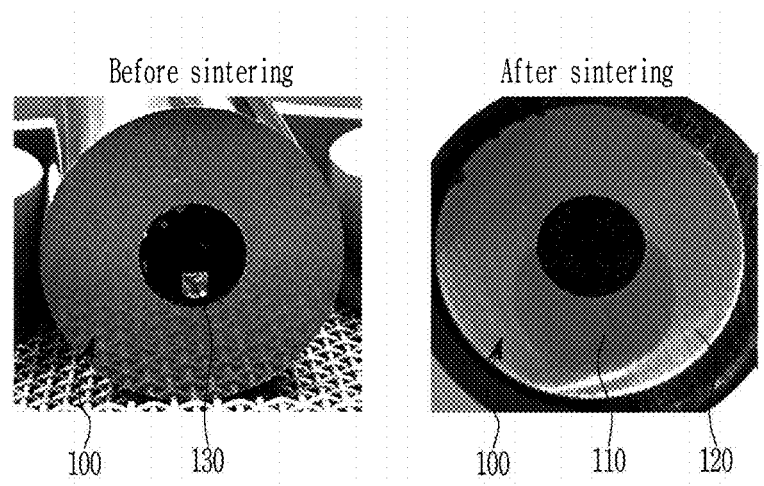
FIG. 7 illustrates a photograph before and after sintering of a piston pin according to another embodiment.

The piston pin 100 according to another embodiment may include the first area 110 and the second area 120 divided in the circumferential direction, and the first area 110 may include a metal infiltrating material 130 (e.g. as shown in FIG. 7).

Since the first area 110 containing the metal infiltrating material 130 has a heavier weight than the second area 120, the piston pin 100 has an eccentric mass center in the circumferential direction. When the centrifugal force in the acceleration direction by the stroke motion of the piston 1 and the connecting rod 2 acts, the piston pin 100 may rotate to the heavier side thereof.

FIG. 7 illustrates a photograph before and after sintering of the piston pin 100 including the metal infiltrating material 130. Referring to FIG. 7, before sintering of the piston pin 100, the metal infiltrating material 130 is applied to an inner diameter surface of the first area 110. Then the piston pin 100 may be sintered to form the first area 110 including the metal infiltrating material 130.

The metal infiltrating material 130 may include copper (Cu) at 90 wt % or more, iron (Fe) at 2 wt % to 5 wt %, and a remaining content of zinc (Zn), manganese (Mn), or a combination thereof, with respect to an entire weight of the metal infiltrating material 130.

Figure 8:
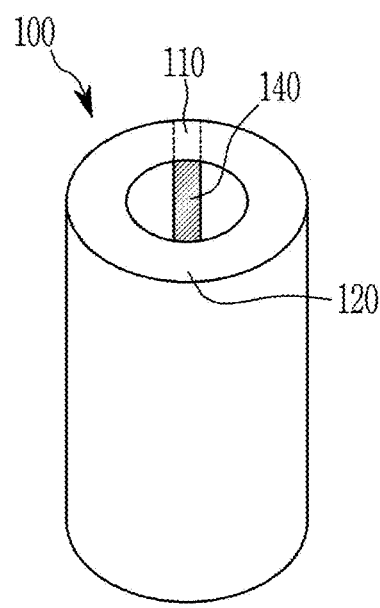
FIG. 8 illustrates a perspective view of a piston pin according to another embodiment.

FIG. 8 illustrates a top plan view of a piston pin 100 according to another embodiment.

Referring to FIG. 8, the piston pin 100 includes the first area 110 and the second area 120 divided in the circumferential direction. A metal paste 140 is applied to the inner diameter surface of the first area 110.

Since the first area 110 to which the metal paste 140 is applied has a heavier weight than the second area 120, the piston pin 100 has an eccentric mass center in the circumferential direction. When the centrifugal force in the acceleration direction by the stroke motion of the piston 1 and the connecting rod 2 acts, the piston pin 100 may rotate to the heavier side thereof.

The metal paste 140 may include copper (Cu) at 90 wt % or more, iron (Fe) at 2 wt % to 5 wt %, and a remaining content of zinc (Zn), manganese (Mn), or a combination thereof, with respect to an entire weight of the metal paste 140.

When the first area 110 includes the metal infiltrating material 130 (e.g. as shown in FIG. 7) or the metal paste 140, a difference in density between the first area 110 and the second area 120 may be 0.05 g/cm$^3$ or more. For example, the difference in density between the first area 110 and the second area 120 may be 0.05 g/cm$^3$ to 0.2 g/cm$^3$. When the difference in density between the first area 110 and the second area 120 is less than 0.05 g/cm$^3$, torque may be weak.

Meanwhile, a mass center in the circumferential direction of a piston pin 100 according to another embodiment may be eccentric by a combination of the above-described embodiments.

In other words, the piston pin 100 may include the first area 110 and the second area 120 divided in the circumferential direction. The first area 110 and second area 120 may have different densities or the center OC of the outer diameter 102 of the pipe and the center (IC) of the inner diameter 103 of the pipe may be eccentric by 0.1 mm or more. The first area 110 may include the metal infiltrating material 130 or the metal paste 140 may be applied to the surface of the inner diameter 103 of the first area 110, or a combination thereof may be applied.

Figure 9:
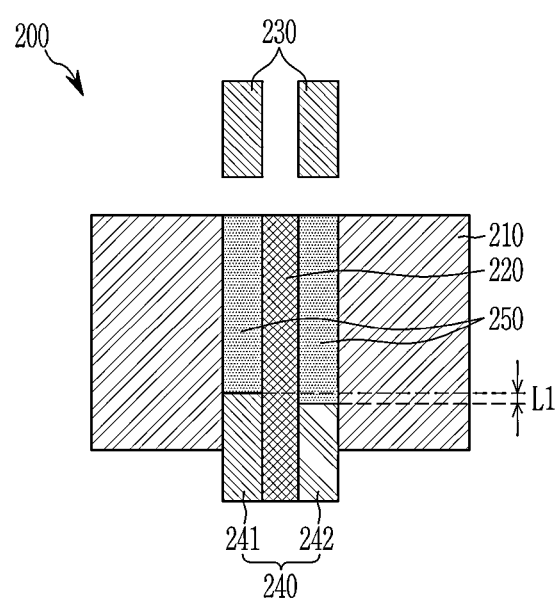
FIG. 9 illustrates a cross-sectional view of a state before pressing of a mold for manufacturing a piston pin according to another embodiment.
Figure 10:
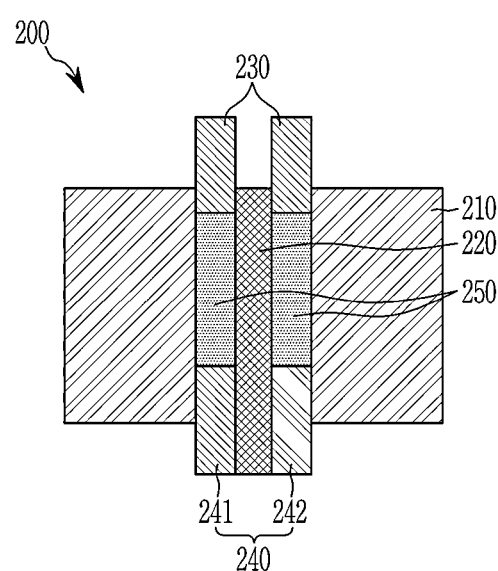
FIG. 10 illustrates a cross-sectional view of a pressing state of the mold of FIG. 9.

FIG. 9 and FIG. 10 illustrate cross-sectional views of a mold used in a manufacturing method of a piston pin according to another embodiment. The manufacturing method of the piston pin is described in detail with reference to FIG. 9 and FIG. 10.

Referring to FIG. 9 and FIG. 10, an iron-based alloy powder 250 is filled in a mold 200 and then pressed to form a pipe shape.

A description of the iron-based alloy powder 250 is the same as described above, so a repeated description has been omitted.

The mold 200 may include a die 210, a core 220, an upper punch 230, and a lower punch 240.

Specifically, the die 210 includes a cylinder-shaped powder filling space, and the core 220 is positioned in a central portion of the powder filling space of the die 210 to be spaced apart from the die 210. The iron-based alloy powder 250 may be formed into a pipe shape by operating the upper punch 230 and the lower punch 240 after inserting the iron-based alloy powder 250 into the powder filling space between the die 210 and the core 220.

In this case, a molding condition of the iron-based alloy powder 250 in the mold 200 may be set so that physical properties that the piston pin 100 must have may be satisfied. For example, these physical properties may include a density of 6.6 g/cm$^3$ or more, an elastic modulus of 120 GPa or more, and rotational bending of 280 MPa or more. Particularly, considering the properties of the sintered material, which has lower mechanical properties such as yield/tension/fatigue than steel, a volume that may realize an equal safety factor and weight design from the difference in density may be applied as molding conditions.

As an example, the molding condition may be set so that the density of the piston pin 100 molded in the mold 200 is 6.4 g/cm$^3$ to 6.9 g/cm$^3$. Accordingly, it is possible to improve the physical properties of the sintered material by facilitating formation of nitrides in pores and around the pores through gas-nitrocarburizing treatment afterwards. To this end, the molding condition may be set to a volume of about 15% to 35% of the entire volume of 100% to have an elastic coefficient of 120 GPa after nitride treatment.

Next, the molded body molded into the pipe shape is sintered.

Chromium (Cr) contained in the iron-based alloy powder 250 is an element that may be easily oxidized, so that it must be sintered in a mixed gas atmosphere of hydrogen and nitrogen, and in this case, hydrogen may be contained in an amount of 10 vol % to 30 vol %. For other materials, an endothermic gas (ENDO), which is a general sintering gas, may be used.

Then, selectively, the manufactured piston pin 100 may be degreased or washed through cleaning and then gas-nitrocarburized.

The gas-nitrocarburizing may be performed for 1 to 4 hours at a temperature of 550° C. to 590° C. A pore network formed in the piston pin 100 by the gas-nitrocarburizing facilitates entering and exiting of the nitrocarburizing gas. As a result, the gas-nitrocarburizing forms nitrides in the pores extending from the surface of the piston pin 100 to the core thereof. The nitrides around the pores, contrary to pores serving as a notch that increases the fatigue load, fill up the pores to some extent while greatly increasing the fatigue load and reduce the size of the pores, thereby increasing the modulus of elasticity.

Selectively, the manufactured piston pin 100 may be impregnated with a primary oil. For example, the oil impregnation may be realized by impregnating the piston pin 100 with a low viscosity oil having a viscosity of 5W30 or higher in a society of automotive engineers (SAE) standard to improve lubricity in a cold state (initial start). By the oil impregnation, the pores of the piston pin 100 are filled with oil through the pore network.

Selectively, the manufactured piston pin 100 may be subjected to a forming process including a centerless process and a superfinishing process.

The centerless process may remove a black skin of a material surface during a cutting process. Or, when an amount of processing is large, it may be dividedly performed by: roughing for fast processing by increasing an amount of cutting; medium-cutting for finishing to be close to a normal dimension while cleaning the roughened surface by the roughing; and cutting for fitting or meeting a design specification.

In the super finishing process, fine and soft grinding stone particles are applied at low pressure, so that the piston pin 100 may have a design size and a smooth and high-precision surface.

As a result, in the piston pin 100, a gas-nitrocarburized compound layer (e.g., a nitride) deposited on the surface of the outer diameter thereof is removed. However, the nitride that has penetrated into a deep portion along the pore network is maintained as is, so that a significant amount of nitride is formed around the pores of a polished surface. More particularly, since a diffusion layer is formed around the nitride (compound layer) in the pore portion, a surface having excellent fatigue strength and abrasion resistance may be obtained. However, the inner diameter of the piston pin 100 is not processed by the centerless process and the super-finishing process. This is because the pores are filled with the nitride (compound layer) formed in the inner diameter, which is advantageous in terms of oil impregnation and lubrication.

Selectively, the piston pin 100 may be cleaned and dried. After degreasing or cleaning the surface of the piston pin 100 through cleaning, it may be dried at 80° C. to 120° C.

Selectively, the piston pin 100 may finally be impregnated with a secondary oil.

For example, the secondary oil impregnation may be realized by impregnating the piston pin 100 with a low viscosity oil having a viscosity of 5W30 or higher in an SAE standard to improve lubricity in a cold state (initial start). In this case, the pore network formed in the piston pin 100 may enhance an effect of oil impregnation. By the oil impregnation, the pores of the piston pin 100 are filled with oil through the pore network.

Meanwhile, the manufacturing method of the piston pin 100 may include an operation for allowing the mass center to be eccentric in the circumferential direction of the molded body.

For example, the operation for allowing the mass center to be eccentric in the circumferential direction of the molded body may be performed by filling a powder filling height differently in the circumferential direction when the iron-based alloy powder 250 is filled into the mold 200, and then by pressing the iron-based alloy powder 250 to have the same height in the circumferential direction.

Specifically, referring to FIG. 9, the lower punch 240 of the mold 200 may include a first lower punch 241 and a second lower punch 242 divided in the circumferential direction. Therefore, when heights of the first lower punch 241 and the second lower punch 242 are differently set to fill the iron-based alloy powder 250 thereon, the iron-based alloy powder 250 may be filled so that the powder filling heights may be different in the circumferential direction. The difference in height may be understood according to the lower punch height difference L1, as shown in FIG. 9. Then, the iron-based alloy powder 250 may be pressed to have the same height in the circumferential direction, i.e., may be pressed by the upper punch 230, so that it is possible to allow the heights of the first lower punch 241 and the second lower punch 242 to be the same.

Accordingly, the first area 110 and the second area 120 divided in the circumferential direction may be included. Thus, the piston pin 100 may be manufactured with the first area 110 and the second area 120 having different densities.

As another example, the operation for allowing the mass center to be eccentric in the circumferential direction of the molded body may be realized by the eccentric between the center of the core 220 and the center of the powder filling space of the die 210. In other words, when the center of the core 220 and the center of the powder filling space of the die 210 are eccentric, the piston pin 100 in which the center of the outer diameter 102 of the pipe and the center of the inner diameter 103 of the pipe are eccentric may be manufactured.

As another example, the operation for allowing the mass center to be eccentric in the circumferential direction of the molded body may be realized by laying the molded body before sintering, applying the metal infiltrating material 130 to the first area 110 of the first area 110 and the second area 120 divided in the circumferential direction of the molded body, and then sintering it. Or, the operation may be realized by erecting the molded body before sintering, applying the metal paste 140 to the surface of the inner diameter 103 of the first area 110, and then sintering it. In this case, it is possible to limit the weight of the metal infiltrating material 130 so that the metal infiltrating material 130 does not diffuse to the entire piston pin 100.

While this disclosure has been described in connection with what are presently considered to be practical embodiments, it is to be understood that the disclosure is not limited to the disclosed embodiments. On the contrary, this disclosure is intended to cover various modifications and equivalent arrangements included within the spirit and scope of the appended claims.

DESCRIPTION OF SYMBOLS

1: piston
2: connecting rod
2a: small end portion
3: snap ring
100: piston pin
101: area dividing line
102: outer diameter
103: inner diameter
110: first area
120: second area
130: metal infiltrating material
140: metal paste
200: mold
210: die
220: core
230: upper punch
240: lower punch
241: first lower punch
242: second lower punch
250: iron-based alloy powder
CD: circumferential direction
LD: length direction
TLO: tangent of outer diameter
TLI: tangent of inner diameter
OC: center of outer diameter
IC: center of inner diameter
E1: eccentric distance
L1: lower punch height difference

What is claimed is:
1. A piston pin comprising:
a pipe-shaped main body made of an iron-based sintered alloy,
wherein the piston pin is configured to be installed to penetrate an upper end of a connecting rod and a piston,
wherein a mass center of the piston pin is eccentric in a circumferential direction,
wherein the piston pin includes a first area and a second area divided in the circumstantial direction, and
wherein the first area and the second area have different densities.
2. The piston pin of claim 1, wherein
the iron-based sintered alloy includes, with respect to an entire weight thereof:
carbon (C) at 0.4 wt % to 0.8 wt %;
chromium (Cr) at 0.2 wt % to 3.5 wt %;
molybdenum (Mo) at 0.1 wt % to 0.3 wt %;
nickel (Ni), manganese (Mn), copper (Cu), or a mixture thereof at 0.2 wt % to 2.0 wt %; and
iron (Fe) as a balance.
3. The piston pin of claim 1, wherein
a density difference between the first area and the second area is 0.05 g/cm$^3$ or more.
4. The piston pin of claim 1, wherein
the first area occupies an area of 30 degrees to 330 degrees in the circumferential direction.
5. The piston pin of claim 1, wherein
an area dividing line separating the first area from the second area forms an angle of 90 degrees with a tangent of an outer diameter of the pipe-shaped main body or a tangent of an inner diameter of the pipe-shaped main body.

6. The piston pin of claim 1, wherein
a center of an outer diameter of the pipe-shaped main body and a center of an inner diameter of the pipe-shaped main body are eccentric by 0.1 mm or more.

7. A piston pin comprising:
a pipe-shaped main body made of an iron-based sintered alloy,
wherein the piston pin is configured to be installed to penetrate an upper end of a connecting rod and a piston,
wherein a mass center of the piston pin is eccentric in a circumferential direction,
wherein the piston pin includes a first area and a second area divided in the circumferential direction, and
wherein the first area includes a metal infiltrating material.

8. The piston pin of claim 7, wherein
the metal infiltrating material contains copper (Cu).

9. The piston pin of claim 7, wherein
a density difference between the first area and the second area is 0.05 g/cm$^3$ or more.

10. The piston pin of claim 7, wherein
the iron-based sintered alloy includes, with respect to an attire weight thereof:
carbon (C) at 0.4 wt % to 0.8 wt %;
chromium (Cr) at 0.2 wt % to 3.5 wt %;
molybdenum (Mo) at 0.1 wt % to 0.3 wt %;
nickel (Ni), manganese (Mn), copper (Cu), or a mixture thereof at 0.2 wt % to 2.0 wt %; and
iron (Fe) as a balance.

11. A piston pin comprising:
a pipe-shaped main body made of an iron-based sintered alloy,
wherein the piston pin is configured to be installed to penetrate an upper end of a connecting rod and a piston,
wherein a mass center of the piston pin is eccentric in a circumferential direction,
wherein the piston pin includes a first area and a second area divided in the circumferential direction, and
wherein a metal paste is applied to an inner diameter surface of the first area.

12. The piston pin of claim 11, wherein
the metal paste contains copper (Cu).

13. The piston pin of claim 11, wherein
a density difference between the first area and the second area is 0.05 g/cm$^3$ or more.

14. The piston pin of claim 11, wherein
the iron-based sintered alloy includes, with respect to an attire weight thereof:
carbon (C) at 0.4 wt % to 0.8 wt %;
chromium (Cr) at 0.2 wt % to 3.5 wt %;
molybdenum (Mo) at 0.1 wt % to 0.3 wt %;
nickel (Ni), manganese (Mn), copper (Cu), or a mixture thereof at 0.2 wt % to 2.0 wt %; and
iron (Fe) as a balance.

15. A piston pin comprising:
a pipe-shaped main body of an iron-based sintered alloy,
wherein the piston pin is configured to be installed to penetrate an upper end of a connecting rod and a piston,
wherein a mass center of the piston is eccentric in a circumferential direction,
wherein the piston pin includes a first area and a second area divided in the circumferential direction,
wherein the first area and the second area have different densities,
wherein a center of an outer diameter of the pipe-shaped main body and a center of an inner diameter of the pipe-shaped main body are eccentric by 0.1 mm or more, and
wherein the first area includes a metal infiltrating material, or a metal paste applied to an inner diameter surface of the first area.

16. The piston pin of claim 15, wherein
the iron-based sintered alloy includes, with respect to an attire weight thereof:
carbon (C) at 0.4 wt % to 0.8 wt %;
chromium (Cr) at 0.2 wt % to 3.5 wt %;
molybdenum (Mo) at 0.1 wt % to 0.3 wt %;
nickel (Ni), manganese (Mn), copper (Cu), or a mixture thereof at 0.2 wt % to 2.0 wt %; and
iron (Fe) as a balance.

* * * * *